(12) United States Patent
Oike (10) Patent No.: US 11,460,955 B2
(45) Date of Patent: Oct. 4, 2022

(54) PROJECTION SYSTEM, POSITION DETECTION SYSTEM, AND METHOD FOR CONTROLLING POSITION DETECTION SYSTEM

(71) Applicant: SEIKO EPSON CORPORATION, Tokyo (JP)

(72) Inventor: Takumi Oike, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 137 days.

(21) Appl. No.: 16/943,238

(22) Filed: Jul. 30, 2020

(65) Prior Publication Data

US 2021/0041983 A1 Feb. 11, 2021

(30) Foreign Application Priority Data

Aug. 7, 2019 (JP) .............................. JP2019-145561

(51) Int. Cl.
| | |
|---|---|
| *G06F 3/042* | (2006.01) |
| *H04N 5/247* | (2006.01) |
| *G06T 7/70* | (2017.01) |
| *H04N 9/31* | (2006.01) |

(52) U.S. Cl.
CPC .............. *G06F 3/0421* (2013.01); *G06T 7/70* (2017.01); *H04N 5/247* (2013.01); *H04N 9/3141* (2013.01); *G06T 2207/10048* (2013.01)

(58) Field of Classification Search
CPC ... G06T 7/70; G06T 7/73; G06T 2207/10048; H04N 9/3194; H04N 5/247; G06F 3/0425; G06F 3/0421
See application file for complete search history.

(56) References Cited

U.S. PATENT DOCUMENTS

| | | | | |
|---|---|---|---|---|
| 2009/0103780 A1* | 4/2009 | Nishihara | ............. | G06F 3/0425 382/103 |
| 2009/0316952 A1* | 12/2009 | Ferren | ................... | G06F 3/0425 382/103 |
| 2013/0063401 A1 | 3/2013 | Ouchida | | |

(Continued)

FOREIGN PATENT DOCUMENTS

| | | |
|---|---|---|
| JP | 2008-129907 A | 6/2008 |
| JP | 2011-059768 A | 3/2011 |

(Continued)

*Primary Examiner* — Vinh T Lam (74) *Attorney, Agent, or Firm* — Dority & Manning, P.A.

(57) ABSTRACT

There is provided a projection system including a projector that projects a projection image on a projection surface and a pointing element that points at the projection surface. The pointing element includes a reflector that is provided at a front end section of the pointing element and reflects infrared light, and an information communication section that transmits contact notification to the projector when the pointing element senses contact between the front end section and an object. The projector includes a light radiator that radiates the infrared light toward the projection surface, a first camera that captures an image of the projection surface, a second camera that is disposed in a position different from a position of the first camera and captures an image of the projection surface, and a detection section that detects a position where the pointing element comes into contact with the projection surface.

11 Claims, 9 Drawing Sheets

(56) References Cited

U.S. PATENT DOCUMENTS

| | | | | |
|---|---|---|---|---|
| 2017/0237955 A1* | 8/2017 | Koyama | .............. | H04N 9/3188 |
| | | | | 348/745 |
| 2018/0074654 A1* | 3/2018 | Tanaka | .................. | G06F 3/0425 |
| 2018/0120960 A1* | 5/2018 | Uchiyama | .............. | G03B 17/54 |
| 2018/0275832 A1 | 9/2018 | Toyooka et al. | | |

FOREIGN PATENT DOCUMENTS

| JP | 2013-061552 A | 4/2013 |
|---|---|---|
| JP | 2013-239102 A | 11/2013 |
| JP | 2016-186676 A | 10/2016 |
| JP | 2018-163217 A | 10/2018 |

* cited by examiner

DPa

FIG. 7

DPb

BRIGHT SPOT DETECTOR 62
BRIGHT SPOT CANDIDATE

| BRIGHT SPOT CANDIDATE | CAPTURED IMAGE | IMAGING SECTION | AREA DETECTION CONDITION |
|---|---|---|---|
| FIRST BRIGHT SPOT CANDIDATE | FIRST CAPTURED IMAGE | FIRST CAMERA | PIXEL VALUE ≥ FIRST THRESHOLD<br>PIXEL VALUE ≤ SECOND THRESHOLD |
| SECOND BRIGHT SPOT CANDIDATE | SECOND CAPTURED IMAGE | SECOND CAMERA | PIXEL VALUE ≥ FIRST THRESHOLD<br>PIXEL VALUE ≤ SECOND THRESHOLD |

FIG. 10

COORDINATE CONVERTER 64
CONVERSION RELATIONSHIP

| BRIGHT SPOT CANDIDATE | POSITION OF CENTER OF GRAVITY IN CAPTURED IMAGE | CONVERSION INFORMATION | POSITION EXPRESSED IN PROJECTOR COORDINATES |
|---|---|---|---|
| FIRST BRIGHT SPOT CANDIDATE | $(Xc1, Yc1)$ | FIRST CONVERSION LOOKUP TABLE | $(Xp1, Yp1)$: FIRST POSITION COORDINATES |
| SECOND BRIGHT SPOT CANDIDATE | $(Xc2, Yc2)$ | SECOND CONVERSION LOOKUP TABLE | $(Xp2, Yp2)$: SECOND POSITION COORDINATES |

FIG. 11

POSITION CALCULATOR 66
CONTACT EVALUATION

| EVALUATION CONDITION USING CAPTURED IMAGE | CONTACT NOTIFICATION | RESULT OF EVALUATION |
|---|---|---|
| $\Delta X, \Delta Y \leq$ THIRD THRESHOLD | YES | IN CONTACT |
| $\Delta X, \Delta Y \leq$ THIRD THRESHOLD | NO | NOT IN CONTACT |
| THIRD THRESHOLD $< \Delta X$, $\Delta Y \leq$ FOURTH THRESHOLD | — | HOVERING |

PROJECTION SYSTEM, POSITION DETECTION SYSTEM, AND METHOD FOR CONTROLLING POSITION DETECTION SYSTEM

The present application is based on, and claims priority from JP Application Serial Number 2019-145561, filed Aug. 7, 2019, the disclosure of which is hereby incorporated by reference herein in its entirety.

BACKGROUND

1. Technical Field

The present disclosure relates to a projection system, a position detection system, and a method for controlling the position detection system.

2. Related Art

JP-A-2011-059768 discloses an electronic pen that emits light via the tip of the pen when used in writing. The electronic pen combined with a projector and a personal computer (PC) forms a display system that virtually displays a pseudo-trajectory written on a writing receiving surface, such as a whiteboard, on the writing receiving surface. JP-A-2013-239102 discloses a technology for achieving pseudo-light-emission from the tip of a pen by providing a main body of the pen with a recursive reflector that reflects light incident thereon back in the light incident direction and detecting a pen pointing coordinate position based on light reception timings at which two image sensors receive the emitted light.

The technology disclosed in JP-A-2011-059768 has a problem of a large amount of electric power consumed by the light emission from the tip of the pen, resulting in an increase in the frequency of exchange or charge of the battery. On the other hand, the technology disclosed in JP-A-2013-239102 has a problem of a difficulty in accurate determination of the state of the tip of the pen on a coordinate input surface and the pen pointing coordinate position.

SUMMARY

A projection system according to an aspect of the present disclosure includes a projector that projects a projection image on a projection surface and a pointing element that points at the projection surface. The pointing element includes a reflector that is provided at a front end section of the pointing element and reflects infrared light, and an information communication section that transmits contact notification to the projector when the pointing element senses contact between the front end section and an object. The projector includes a light radiator that radiates the infrared light toward the projection surface, a first camera that captures an image of the projection surface, a second camera that is disposed in a position different from a position of the first camera and captures an image of the projection surface, and a detection section that detects a position where the pointing element comes into contact with the projection surface based on a position of the reflector detected with the first and second cameras and the contact notification.

A position detection system according to another aspect of the present disclosure includes a pointing element that points at an operation surface and a positron detection apparatus that detects a position at which the pointing element is pointing. The pointing element includes a reflector that is provided at a front end section of the pointing element and reflects infrared light, and an information communication section that transmits contact notification to the position detection apparatus when the pointing element senses contact between the front end section and the operation surface. The position detection apparatus includes a light radiator that radiates the infrared light toward the operation surface, a first camera that captures an image of the operation surface, a second camera that is disposed in a position different from a position of the first camera and captures an image of the operation surface, and a detection section that that detects a position where the pointing element is pointing at the operation surface based on a position of the reflector detected with the first and second cameras and the contact notification.

A method for controlling a position detection system according to an aspect of the present disclosure is a method for controlling a position detection system including a pointing element that points at an operation surface and includes a reflector that is disposed at a front end section of the pointing element and reflects infrared light, and a position detection apparatus that includes a first camera and a second camera disposed in a position different from a position of the first camera and detects a position at which the pointing element is pointing. The pointing element transmits contact notification to the position detection apparatus when the pointing element senses contact between the front end section and the operation surface. The position detection apparatus causes an infrared light radiator to radiate the infrared light toward the operation surface, causes the first and second cameras to each capture an image of the operation surface, and detects a position where the pointing element is pointing at the operation surface based on a position of the reflector detected with the first and second cameras and the contact notification.

DESCRIPTION OF EXEMPLARY EMBODIMENTS

Embodiments will be described below with reference to the drawings. In the drawings, the dimension and scale of each portion differ from actual values as appropriate. Further, a variety of technically preferable restrictions are imposed on the embodiments described below, and the embodiments are not necessarily configured as described below.

1. First Embodiment

Figure 1:
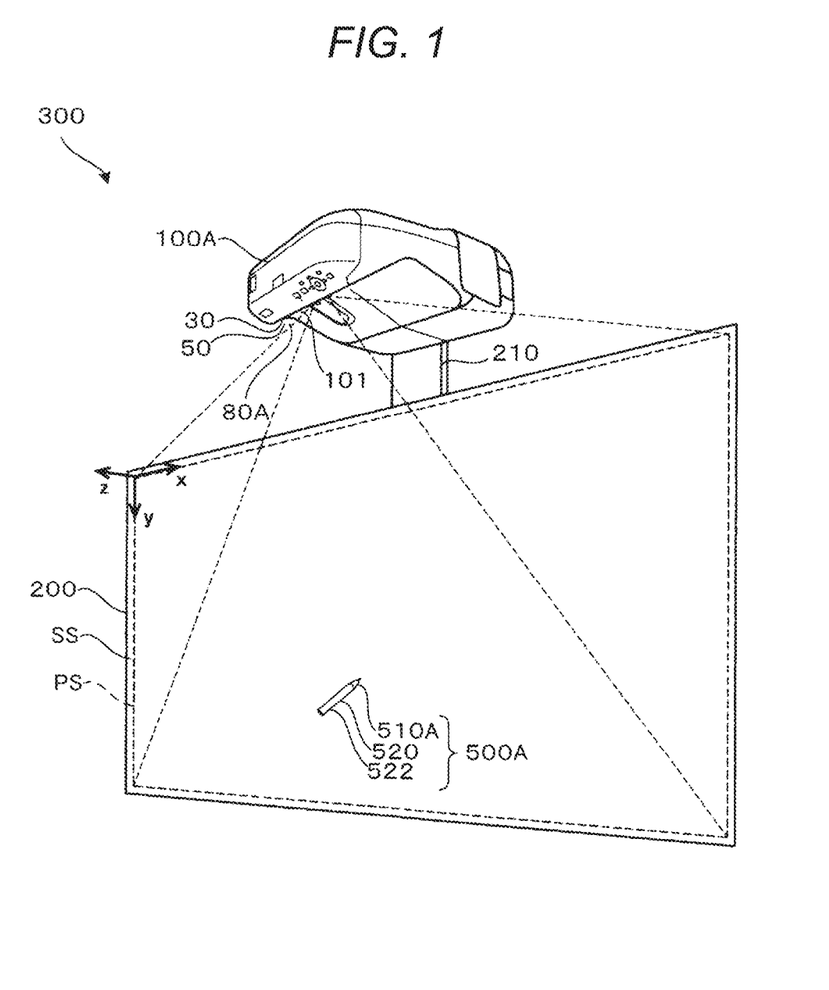
FIG. 1 is a perspective view of a projection system according a first embodiment of the present disclosure.
Figure 2:
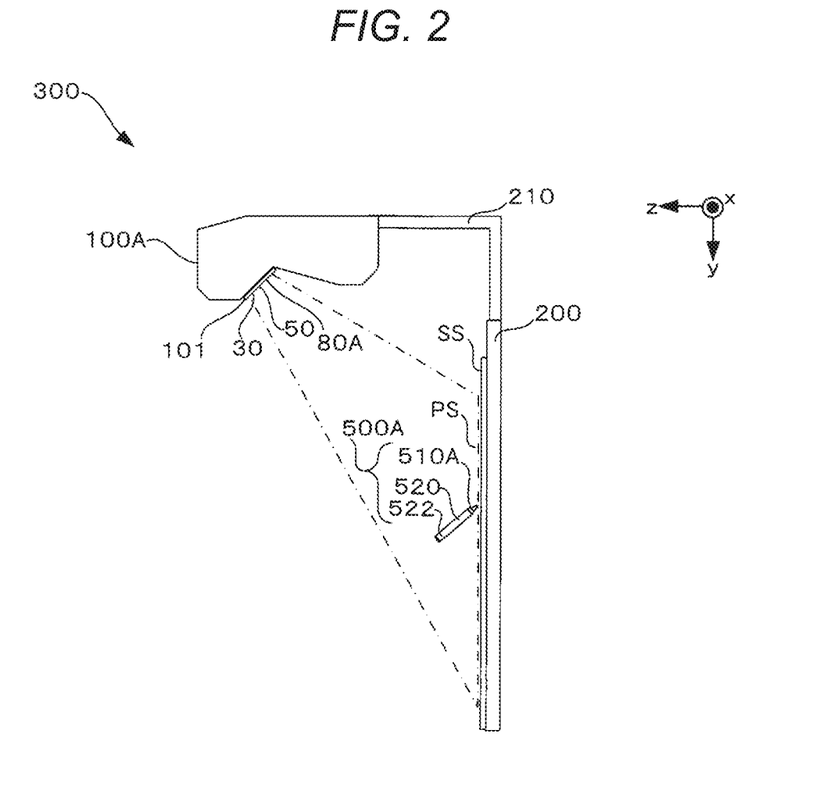
FIG. 2 is a side view of the projection system according to the first embodiment of the present disclosure.

FIG. 1 is a perspective view of a projection system 300 according an embodiment of the present disclosure. FIG. 2 is a side view of the projection system 300. The projection system 300 includes a projector 100A, a projection plate 200, and a pointing element 500A. The front surface of the projection plate 200 is used as a projection surface SS, on which an image is projected by the projector 100A. The projector 100A is fixed by a support member 210 in front of the projection plate 200 and vertically above the projection plate 200. In the following description, the vertical direction is called an axis-y direction, the direction of a normal to the projection plate 200 is called an axis-z direction, and the direction perpendicular to both the axis-y and axis-z directions is called an axis-x direction, as shown in FIG. 1. The axis x is an example of a first coordinate axis perpendicular to the normal to the projection surface SS, and the axis y is an example of a second coordinate axis perpendicular to both the first coordinate axis and the normal to the projection surface SS. In FIG. 1, the projection plate 200 is so disposed as to vertically stand and can instead be so disposed as to horizontally lie. In the latter case, the projector 100A can be disposed vertically above the projection plate 200 to form the projection system 300. The projection system 300 can also be configured as a posit on detection system including the pointing element 500A and a position detection apparatus that is formed of the projector 100A and detects a position at which the pointing element 500A is pointing.

The projector 100A projects a projection image PS via a projection section 30 on the projection surface SS of the projection plate 200. The projection image PS is an example of the image projected on the projection plate 200 by the projector 100A. The projection image PS typically includes an image having been drawn in the projector 100A. When the projector 100A has no drawn image therein, the projector 100A radiates light on the projection surface SS to display a white image. In the present specification, the projection surface SS means a surface of a member on which an image is projected. The projection image PS means the area of the image projected on the projection surface SS from the projector 100A. The projection image PS is typically projected on part of the projection surface SS.

The pointing element 500A is, for example, an electronic pen capable of information communication. The pointing element 500A includes a front end section 510A and a shaft section 520, which is held by a user of the projection system 300. The front end section 510A is provided with a reflector that reflects light incident thereon. Although will be described later in detail, the pointing element 500A includes an information communication section 522, which transmits contact notification to the projector 100A when the pointing element 500A senses that the front end section 510A is in contact with another object. For example, when the user of the projection system 300 causes the front end section 510A of the pointing element 500A to come into contact with the projection surface SS to write something on or otherwise manipulate the projection image PS, the pointing element 500A transmits the contact notification to the projector 100A.

The projector 100A radiates infrared light via a light radiator 80A toward the projection surface SS and causes a first camera 52a and a second camera 52b in an imaging section 50 to each capture an image of the state of the infrared light reflected off the projection surface SS. When the user of the projection system 300 causes the pointing element 500A to approach the projection surface SS, a reflector 514A provided in the front end section 510A reflects the infrared light from the light radiator 80A, and the first camera 52a and the second camera 52b detect the position of the reflector 514A with respect to the projection surface SS in accordance with the reflected light. Although will be described later in detail, the projector 100A can analyze images captured by the imaging section 50 and containing a bright spot according to the light reflected off the reflector 514A to detect the position the position of the front end section 510A with respect to the projection surface SS. The projector 100A detects the contact between the pointing element 500A and the projection surface SS and the contact position on the projection surface SS based on the analysis of the captured images and the contact notification from the pointing element 500A. The projector 100A then carries out a process associated with the position on the projection image PS that corresponds to the position where the front end section 510A is in contact with the projection surface SS. The projection surface SS including the projection image PS functions as an operation surface operated when the pointing element 500A points at a position on the projection image PS. The position where the front end section 510A is in contact with the projection surface SS is calculated in the form of two-dimensional coordinates specified by the axes x and y on the projection surface SS. The axis x on the projection surface SS is an example of one of the two coordinate axes that specify the two-dimensional coordinates described above, and the axis y is an example of the other coordinate axis.

Figure 3:
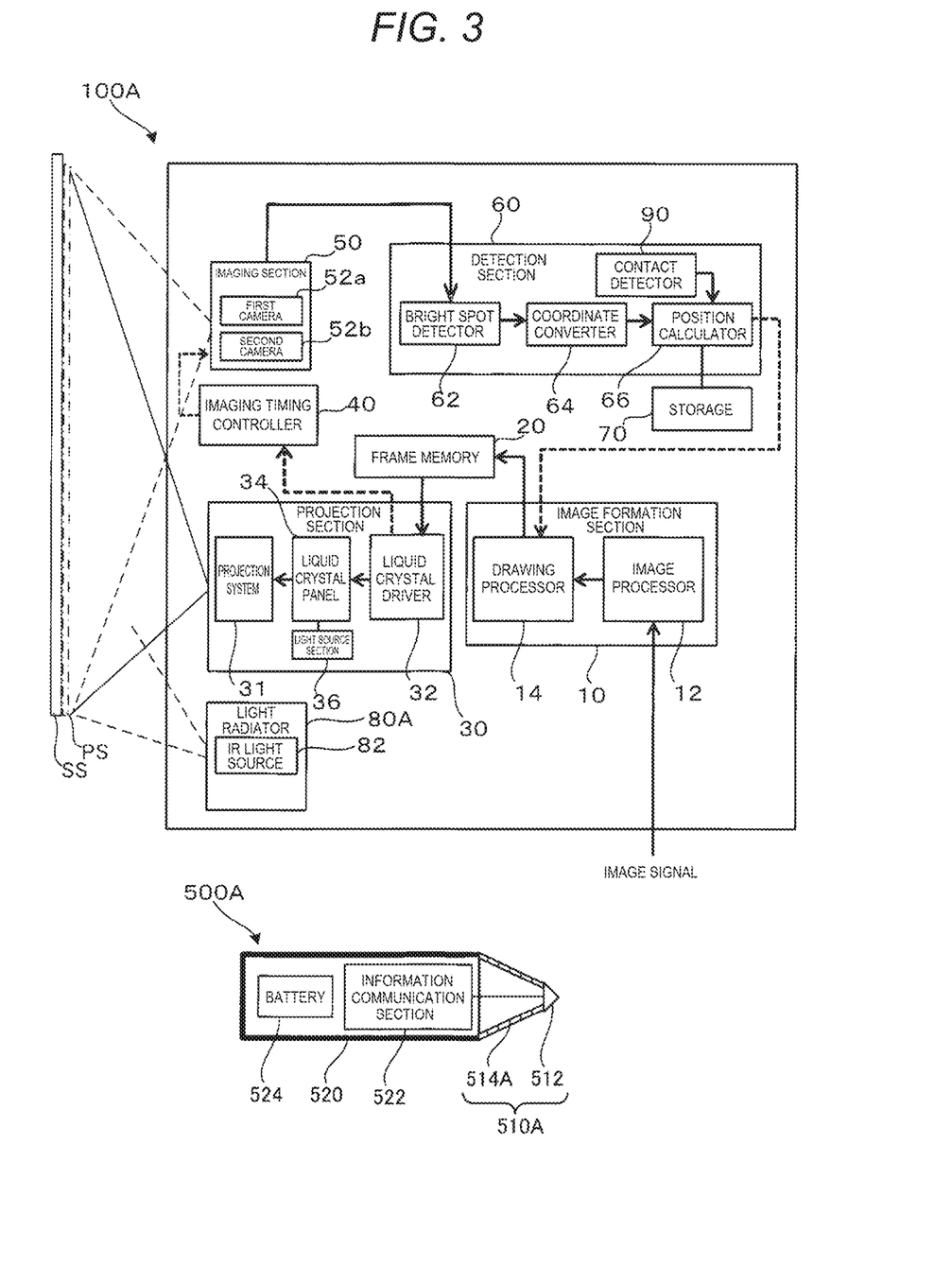
FIG. 3 is a block diagram showing an example of the configurations of a projector and a pointing element provided in the projection system.

FIG. 3 shows an example of the configurations of the pointing element 500A and the projector 100A.

The pointing element 500A includes the front end section 510A and the shaft section 520. The front end section 510A is provided with a contact sensor 512 and the reflector 514A. The contact sensor 512 is, for example, a pressure sensitive sensor and outputs a signal according to the pressure produced when the pointing element 500A comes into contact with another object. The shaft section 520 is a portion grasped by the user. The pointing element 500A includes the information communication section 522, which is built in the pointing element 500A and transmits the contact notification to the projector 100A in accordance with the output from the contact sensor 512, and a battery 524, which is built in the pointing element 500A and supplies the contact sensor 512 and the information communication section 522 with operating electric power.

The pointing element 500A is activated, for example, when the user grasps the shaft section 520. After the pointing element 500A is activated, the information communication section 522 thereof refers to the signal outputted from the contact sensor 512 and periodically transmits a contact state signal representing the contact state to the projector 100A when the pressure indicated by the output signal is greater than or equal to a predetermined threshold. For example, in a state in which the user of the pointing element 500A has caused the front end section 510A of the pointing element 500A to be in contact with the projection surface SS to write something on or otherwise manipulate the projection image PS, the information communication section 522 transmits the contact state signal every 20 seconds. The pointing element 500A in the present embodiment transmits the contact state signal only when the front end section 510A is in contact with another object but does not otherwise transmit the contact state signal. The electric power consumed by the pointing element 500A can therefore be suppressed as compared, for example, with a self-luminous electronic pen that regularly transmits position information as long as the pen is in operation. The contact state signal is transmitted from the pointing element 500A to the projector 100A in the form of infrared light emission capturable by the imaging section 50 or a signal receivable by a remote control signal receiver that is not shown but is provided in the projector 100A.

The projector 100A includes an image formation section 10, a frame memory 20, the projection section 30, an imaging timing controller 40, the imaging section 50, a detection section 60, a storage 70, and the light radiator 80A. The light radiator 80A includes an IR light source 82, which emits infrared light. The light radiator 80A radiates the infrared light emitted from the IR light source 82 onto the projection surface SS.

The image formation section 10 and the detection section 60 are each a software module achieved when a processor, such as a digital signal processor (DSP) or a central processing unit (CPU), is operated in accordance with software. The image formation section 10 includes an image processing section 12 and a drawing processing section 14. The image formation section 10 forms projection image data based on an image signal inputted thereto. Specifically, the image signal undergoes image processing performed by the image processing section 12. Specific examples of the image processing may include color correction and image quality enhancement. The image signal having undergone the image processing undergoes a drawing process carried out by the drawing processing section 14. As an example of the drawing process, the trajectory of the front end section 510A of the pointing element 500A drawn on the projection surface SS is drawn based on position information provided from the detection section 60. The image formation section 10 is coupled to the frame memory 20. The image formation section 10 writes the projection image data having undergone the drawing process carried out by the drawing processing section 14 on the frame memory 20.

The frame memory 20 is a volatile memory having a storage area that stores the projection image data corresponding to one frame. The volatile memory refers to storage device that cannot hold information stored therein when no electric power is supplied thereto. The frame memory 20 is coupled to the projection section 30 so that the projection section 30 can read the projection image data.

The projection section 30 projects the projection image PS on the projection surface SS in accordance with the projection image data stored in the frame memory 20. The projection section 30 includes a projection system 31 including a projection lens, a liquid crystal driver 32, a liquid crystal panel 34, and a light source section 36. The liquid crystal driver 32 reads the projection image data stored in the frame memory 20 and drives the liquid crystal panel 34. The liquid crystal driver 32 drives the liquid crystal panel 34 alternately in positive polarity operation and negative polarity operation to suppress ghosting on the liquid crystal panel 34. The liquid crystal driver 32 controls the liquid crystal panel 34 to cause it to display the projection image PS in the sequential scanning scheme. The liquid crystal driver 32 generates a drive timing signal representing the timing at which the liquid crystal panel 34 is driven and transmits the generated drive timing signal to the imaging timing controller 40. The light source section 36 includes, for example, a light source, such as a halogen lamp or a laser diode. The light from the light source section 36 is modulated by the liquid crystal panel 34 on a pixel basis and projected via the projection system 31 on the projection surface SS. That is, an image drawn on the liquid crystal panel 34 based on the projection image data is projected on the projection surface SS. The liquid crystal panel 34 is an example of a light modulator and may be replaced with a digital mirror device or any other light modulation device.

In the present embodiment, the projection section 30 switches the projection image PS to another in the line sequential scanning scheme. For example, the drawing on the liquid crystal panel 34 is performed on a line basis, and the drawn line is successively updated in the scan direction perpendicular to the line direction. The line sequential scanning may be replaced with the block sequential scanning.

The imaging timing controller 40 is coupled to the liquid crystal driver 32 and the imaging section 50. The imaging timing controller 40 generates an imaging timing signal based on the drive timing signal generated by the liquid crystal driver 32. The generated imaging timing signal is transmitted from the imaging timing controller 40 to the imaging section 50.

The imaging section 50 captures an image of the projection surface SS to form captured image data. The timing at which the imaging section 50 performs the imaging is so controlled based on the imaging timing signal received from the imaging timing controller 40 that the imaging section 50 is driven in synchronization with the timing at which the projection section 30 is driven. The imaging section 50 includes two cameras. The first camera 52a is so provided in the projector 100A that the entire projection surface SS falls within the imaging field of the first camera 52a. The second camera 52b is so provided in the projector 100A in a position different from the position of the first camera 52a that the entire projection surface SS falls within the imaging field of the second camera 52b. An image captured with the first camera 52a is an example of a first captured image, and an image captured with the second camera 52b is an example of a second captured image.

Figure 4:
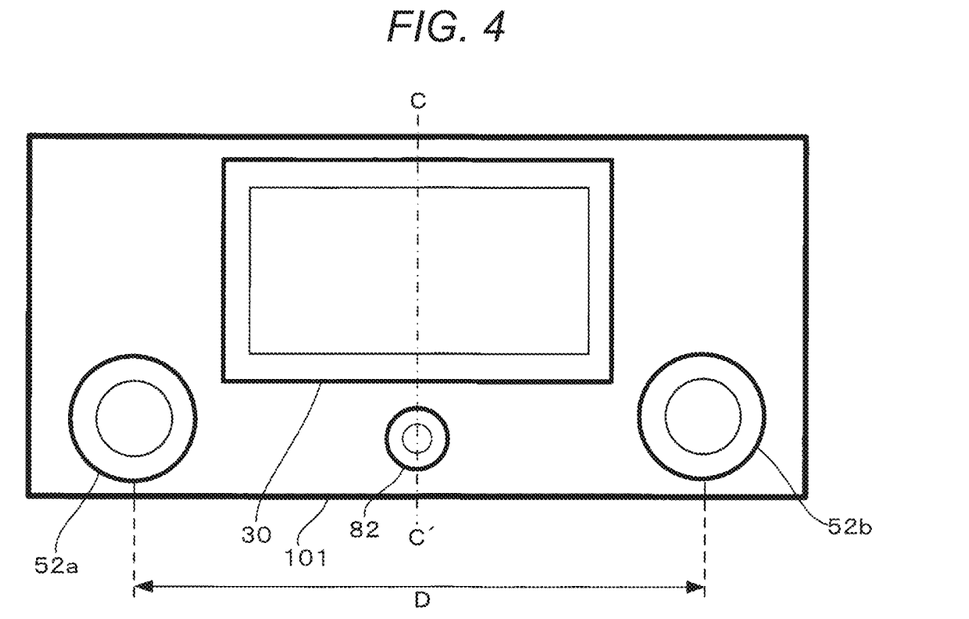
FIG. 4 shows an example of the arrangement of a first camera, a second camera, and a light radiator on a surface of the projector.

FIG. 4 shows an example of a surface 101 of the projector 100A shown in FIGS. 1 and 2. For example, the surface 101 faces the projection surface SS and is provided with an imaging lens of the first camera 52a, an imaging lens of the second camera 52b, a projection port for the projection section 30, and a radiation port for the IR light source 82. FIG. 4 shows an example of the arrangement of the projection port for the projection section 30, the radiation port for the IR light source 82, the imaging lens of the first camera 52a, and the imaging lens of the second camera 52b on the surface 101. For example, the projection port for the projection section 30 and the radiation port for the IR light source 82 are provided on a line CC', which is the center line of the surface 101, and the imaging lens of the first camera 52a and the imaging lens of the second camera 52b are provided with a gap D therebetween along the axis x symmetrically with respect to the center line CC'. The first captured image captured with the first camera 52a and the second captured image captured with the second camera 52b have parallax therebetween, which allows calculation of the coordinates of the position of the pointing element 500A based on triangulation. The first camera 52a is an example of a first camera provided in the projector 100A, and the second camera 52b is an example of a second camera provided in the projector 100A. In the following description, when it is unnecessary to distinguish the first camera 52a and the second camera 52b from each other, the first camera 52a and the second camera 52b are collectively called cameras 52. The first camera 52a and the second camera 52b may instead be disposed with a gap therebetween along a direction different from the direction of the axis x.

Although not illustrated in detail in FIGS. 3 and 4, the cameras 52 each include an imaging device, such as a CMOS image sensor, and an imaging lens. Further, a first wavelength cutoff filter and a second wavelength cutoff filter are so placed at the front surface of the imaging device as to be switchable from one to the other. The first wavelength cutoff filter is a wavelength cutoff filter that transmits infrared light but no visible light, and the second wavelength cutoff filter is a wavelength cutoff filter that transmits visible light but no infrared light. In typical use of the projector 100A, for example, when the projector 100A is used to project an image for presentation, the first wavelength cutoff filter is placed at the front surface of the cameras 52. As a result, the cameras 52 can capture the infrared light radiated from the light radiator 80A and reflected off the pointing element 500A but cannot capture an image of the projection image PS formed of visible light and projected on the projection surface SS. In contrast, in calibration performed when the projector 100A is installed, the second wavelength cutoff filter is placed at the front surface of the cameras 52. The projector 100A performs the calibration by projecting the projection image PS and capturing an image of the projection image PS.

In the calibration, the projector 100A generates and saves conversion information for converting a two-dimensional coordinate position in the image captured with each of the cameras 52 into a two-dimensional coordinate position on the projection surface SS. For example, the projector 100A generates a conversion lookup table that converts the coordinate system of the first and second captured images into a corresponding coordinate system of the projection surface SS for each of the first camera 52a and the second camera 52b and stores the generated conversion lookup table in the storage 70. In the following description, the coordinate system of a captured image, for example, a coordinate system having an origin located at the upper left corner of the captured image is called a camera coordinate system, and the coordinate system of the projection surface SS is called a projector coordinate system. The camera coordinate system is expressed by (Xc, Yc), and the projector coordinate system is expressed by (Xp, Yp) or (x, y). Further, in the following description, the conversion lookup table for the first camera 52a is called a first conversion lookup table, and the conversion lockup table for the second camera 52b is called a second conversion lookup table. Instead, a conversion function may be used and may perform calibration to calculate and store a conversion parameter, such as a conversion coefficient of the conversion function. The storage 70 is a nonvolatile memory for storing the first and second conversion lookup tables.

Figure 5:
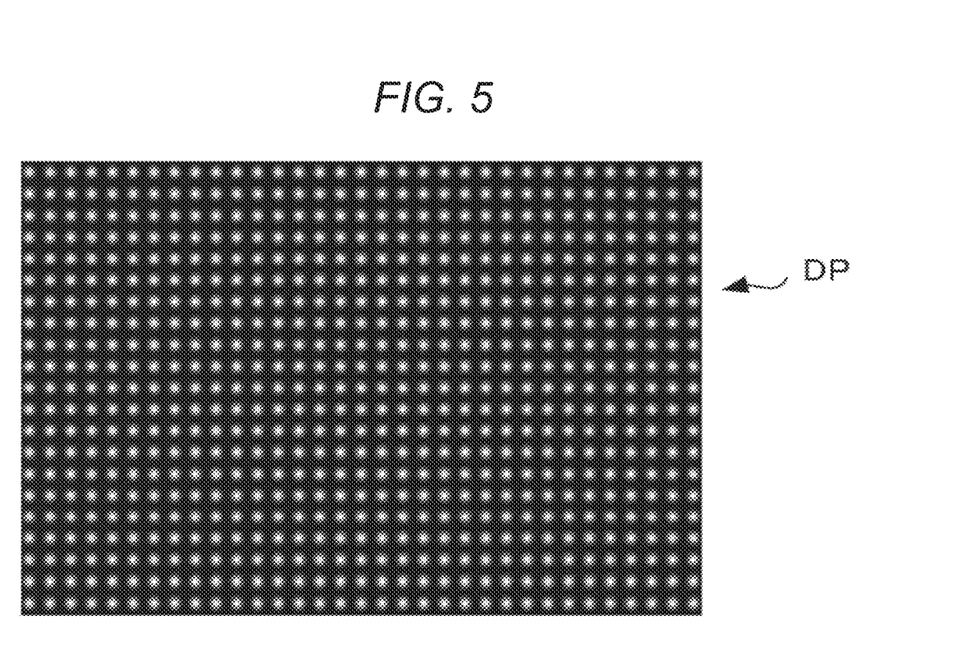
FIG. 5 shows an example of a calibration image having a dot pattern and projected by a projection section in calibration performed by the projector.
Figure 6:
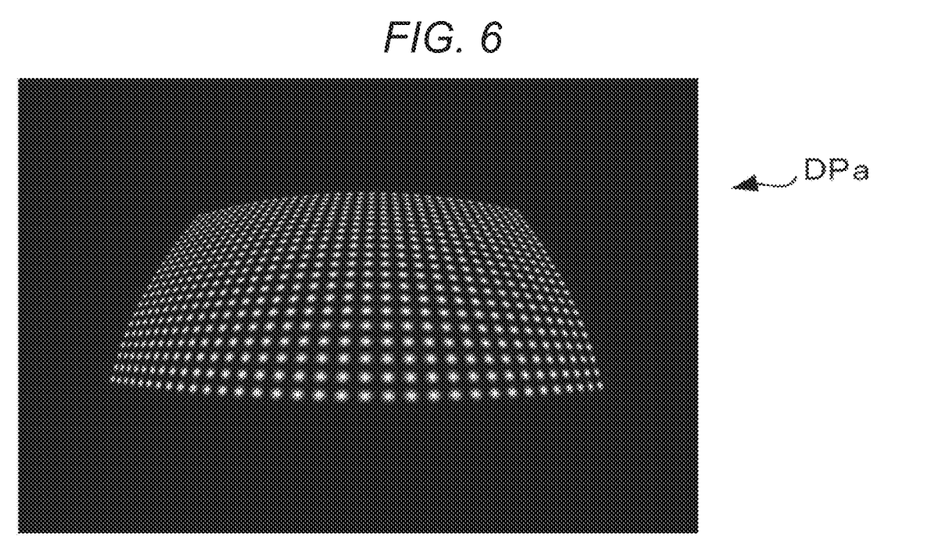
FIG. 6 shows an example of a captured image captured by a first camera in the calibration performed by the projector.
Figure 7:
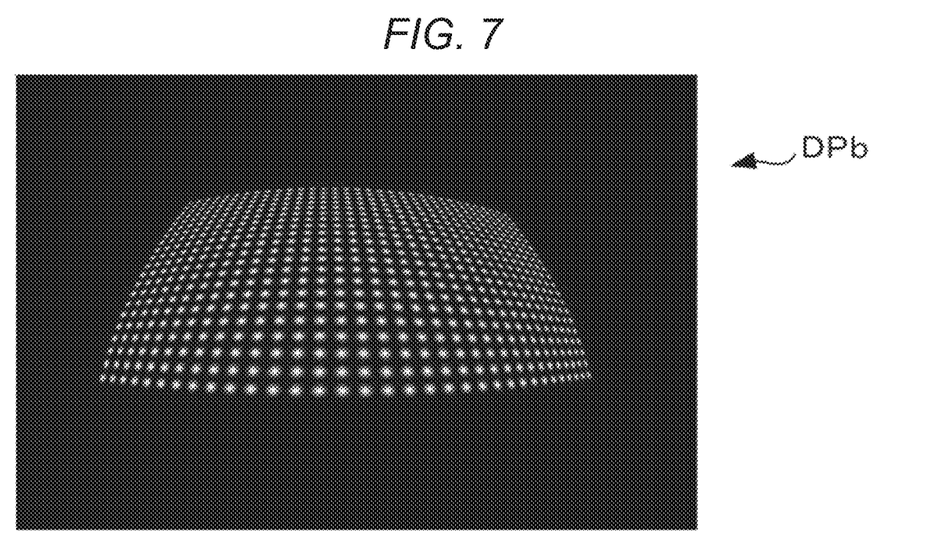
FIG. 7 shows an example of a captured image captured by a second camera in the calibration performed by the projector.

In the calibration, the projector 100A projects a calibration image DP having a dot pattern shown in FIG. 5 on the projection surface SS and causes the first camera 52a and the second camera 52b to each capture an image of the projection surface SS. FIG. 6 shows an example of a captured image DPa provided by causing the first camera 52a to capture an image of the projection surface SS on which the calibration image DP is projected. FIG. 7 shows an example of a captured image DPb provided by causing the second camera 52b to capture an image of the projection surface SS on which the calibration image DP is projected. The dot pattern displayed in the captured image DPa has distortion according to the position where the first camera 52a is installed and the imaging lens. Similarly, the dot pattern displayed in the captured image DPb has distortion according to the position where the second camera 52b is installed and the imaging lens. The projector 100A calculates coordinates of the center of gravity in the camera coordinate system, for each of the dots in the captured image DPa and determines the coordinates, in the projector coordinate system, of the position of the corresponding dot in the calibration image DP to generate the first conversion lookup table. As for an inter-dot pixel, the coordinates of the position of the inter-dot pixel in the projector coordinate system may be determined based on the coordinates of four dots around the inter-dot pixel by using bilinear interpolation. The projector 100A similarly generates the second conversion lookup table based on the captured image DPb and the calibration image DP.

The detection section 60 is coupled to the imaging section 50 and the drawing processing section 14. The detection section 60 detects the position of the front end section 510A of the pointing element 500A with respect to the projection surface SS based on the first captured image captured with the first camera 52a and the second captured image captured with the second camera 52b, and when the contact notification is detected, the detected position is identified as the contact position. The contact position is the position at which the pointing element 500A is pointing. The detection section 60 includes a contact detector 90, a bright spot detector 62, a coordinate converter 61, and a position calculator 66, as shown in FIG. 3.

The contact detector 90 detects the contact notification from the pointing element 500A and outputs the contact notification to the position calculator 66. The contact notification is transmitted as the contact state signal from the information communication section 522 of the pointing element 500A. The contact detector 90 detects as the contact notification the contact state signal received by the remote control signal receiver of the projector 100A.

The bright spot detector 62 detects, from the first captured image captured with the first camera 52a, one or more first bright spot candidates that are candidates of a bright spot corresponding to the light reflected off the reflector 514A of the pointing element 500A. The bright spot detector 62 further detects, from the second captured image captured with the second camera 52b, one or more second bright spot candidates that are candidates of the bright spot corresponding to the light reflected off the reflector 514A of the pointing element 500A. The transmission and reception of the captured image data from the detection section 60 to the imaging section 50 and vice versa may be performed via a line memory that stores image data corresponding to a plurality of lines. In this case, the bright spot detector 62 may sequentially read the captured image data from the line memory and sequentially start the detection of bright spot candidates from an area an image of which has been captured.

Figure 9:
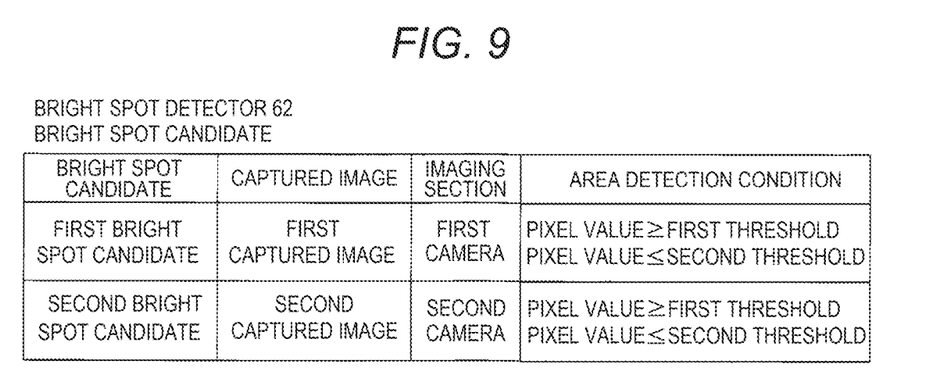
FIG. 9 shows examples of a condition under which a bright spot candidate is detected.

In more detail, the bright spot detector 62 detects, as a bright spot candidate, a locally bright area of an image captured with each of the cameras 52, specifically, an area which corresponds to a set of pixels each having a pixel value greater than or equal to a first threshold and where the number of pixels that belong to the area is smaller than or equal to a second threshold. FIG. 9 shows an example of the bright spot candidates. For example, when the pixel value in an image captured with each of the cameras 52 ranges from 0 to 255, a specific example of the first threshold may be 233. A specific example of the second threshold may be 10.

When an image captured with each of the cameras 52 contains a plurality of areas each of which correspond to a set of pixels each having a pixel value greater than or equal to the first threshold and in each of which the number of pixels that belong to the area is smaller than or equal to the second threshold, the bright spot detector 62 detects each of the plurality of areas as a bright spot candidate. When an image captured with each of the cameras 52 contains no area which corresponds to a set of pixels each having a pixel value greater than or equal to the first threshold and where the number of pixels that belong to the area is smaller than or equal to the second threshold, the bright spot detector 62 detects no bright spot candidate.

The coordinate converter 64 first calculates the position (Xc1, Yc1) of the center of gravity of the area corresponding to the first bright spot candidate detected by the bright spot detector 62 and sets the calculated position of the center of gravity to be the position of the first bright spot candidate. When the bright spot detector 62 detects a plurality of first bright spot candidates, the coordinate converter 64 calculates the position of each of the plurality of first bright spot candidates. The coordinate converter 64 similarly calculates the position (Xc2, Yc2) of the center of gravity of the area corresponding to the second bright spot candidate detected by the bright spot detector 62.

Figure 10:
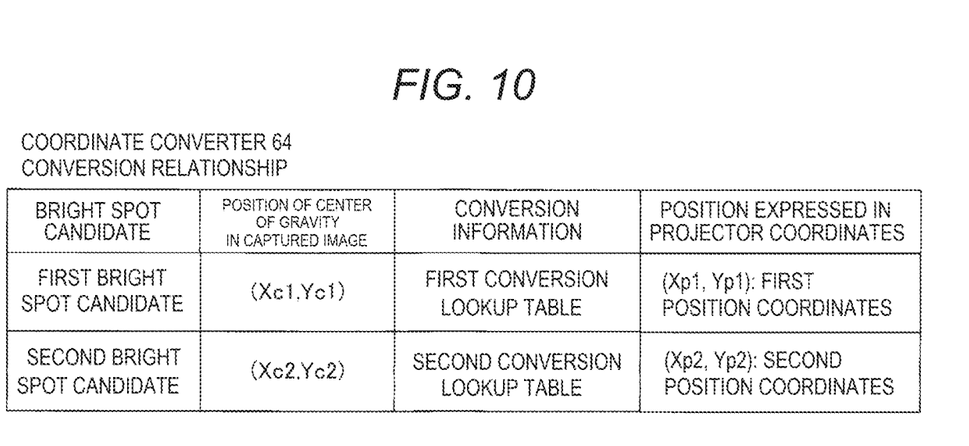
FIG. 10 shows an example of bright spot candidate conversion.

The coordinate converter 64 then refers to the first conversion lookup table stored in the storage 70 and converts the coordinates (Xc1, Yc1) of the position of the first bright spot candidate in the image captured with the first camera 52a into first position coordinates (Xp1, Yp1) representing the position in the projector coordinate system. Similarly, the coordinate converter 64 refers to the second conversion lookup table stored in the storage 70 and converts the coordinates (Xc2, Yc2) of the position of the second bright spot candidate in the image captured with the second camera 52b into second position coordinates (Xp2, Yp2) representing the position in the projector coordinate system. FIG. 10 shows an example of the coordinate conversion. Conversion of the coordinates of the positions of the first and second bright spot candidates into position coordinates in the projector coordinate system allows evaluation of whether or not the front end section 510A of the pointing element 500A is in contact with the projection surface SS based on the first and second position coordinates. When the first and second position coordinates coincide with each other, presence of the infrared light reflection position, which is the origin of the bright spot, on the projection surface SS can be detected. That is, when the first and second position coordinates coincide with each other, it can be determined that the front end section 510A of the pointing element 500A is in contact with the projection surface SS. On the other hand, the farther the infrared light reflection position, which is the origin of the bright spot, from the projection surface SS in the axis-z direction, the greater the difference between the first position coordinates and the second position coordinates. When whether the first and second position coordinates coincide with each other is determined by the allowance of the difference, the accuracy of the evaluation of whether or not the front end section 510A of the pointing element 500A is in contact with the projection surface SS and the accuracy of the detection of the contact position are likely to lower depending on the allowance.

When the difference between the first position coordinates and the second position coordinates is smaller than or equal to the allowance, the position calculator 66 determines that the front end section 510A is in contact with the projection surface SS. When it has been determined that the front end section 510A is in contact with the projection surface, and the contact notification has been detected, the position calculator 66 uses the first and second position coordinates to calculate the coordinates of the position of the front end section 510A in the projector coordinate system.

In more detail, the position calculator 66 calculates a coordinate difference ($\Delta Xp$, $\Delta Yp$) between the first position coordinates (Xp1, Yp1) and the second position coordinates (Xp2, Yp2) in accordance with Expression 1 below. When at least one of the first and second bright spot candidates is formed of a plurality of bright spot candidates, the position calculator 66 calculates the coordinate difference for each combination of all the first and second bright spot candidates. When one of the first and second bright spot candidates has not been detected, the position calculator 66 does not calculate the coordinate difference.

$$(\Delta Xp, \Delta Yp) = (Xp1 - Xp2, Yp1 - Yp2) \quad \text{Expression 1}$$

The position calculator 66 then evaluates whether or not the front end section 510A is in contact with the projection surface SS based on the coordinate difference ($\Delta Xp$, $\Delta Yp$). In more detail, the following items (i) and (ii) are detected.

(i) For the combination of first and second bright spot candidates showing that the coordinate difference $\Delta Xp$ along one of the coordinate axes is smaller than or equal to a third threshold and the coordinate difference $\Delta Yp$ along the other coordinate axis is smaller than or equal to the third threshold, the position calculator 66 detects the combination as a bright spot candidate corresponding to the front end section 510A in contact with the projection surface SS. That is, the combination of the first and second bright spot candidates satisfies $\Delta Xp \leq$ third threshold and $\Delta Yp \leq$ third threshold.

(ii) For the combination of first and second bright spot candidates showing that third threshold $< \Delta Xp \leq$ fourth threshold and third threshold $< \Delta Yp \leq$ fourth threshold, the position calculator 66 detects the combination as a bright spot candidate corresponding to the front end section 510A not in contact with the projection surface SS, that is, the front end section 510A hovering above the projection surface SS.

For the combination of first and second bright spot candidates to which (i) or (ii) applies, the position calculator 66 considers the combination to be a bright spot resulting from an origin other than the reflector 514A of the front end section 510A and excludes the combination from the bright spot candidates corresponding to the front end section 510A. In the present embodiment, the third threshold are 4 pixels, and the fourth threshold are 30 pixels. An optimum value of each of the third and fourth thresholds described above varies in accordance with the gap D between the installed first camera 52a and second camera 52b, and the optimum value of each of the third and fourth thresholds described above may be specified by an experiment performed as appropriate. The third threshold is an example of the allowance and can be specified without depending on the sensitivity and other factors of the contact sensor 512 of the pointing element 500A.

Figure 11:
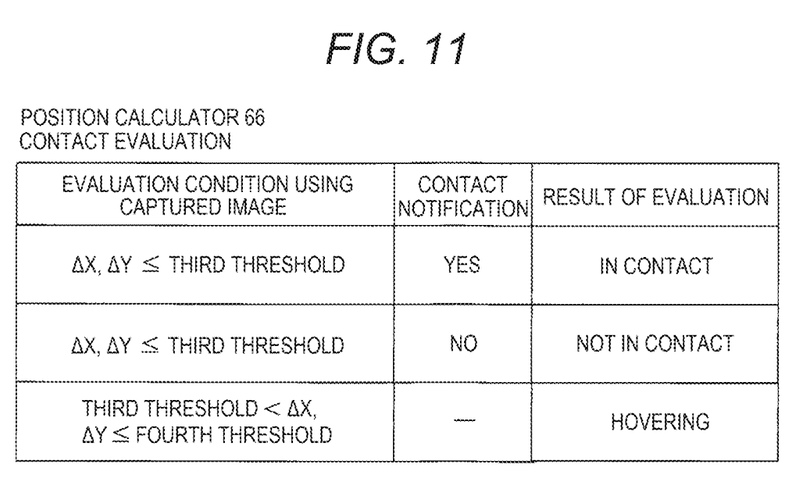
FIG. 11 shows an example of a contact evaluation condition.

The position calculator 66 calculates the position coordinates (Xp, Yp) for each of the candidates of the front end section 510A in contact with the projection surface SS and the front end section 510A hovering above the projection surface SS. When only one of the candidates of the front end section 510A in contact with the projection surface SS has been detected, and the contact detector 90 has detected the contact notification, the position calculator 66 determines that the front end section 510A of the pointing element 500A is in contact with the projection surface SS, finalizes the position coordinates (Xp, Yp) calculated in accordance with Expression 2 as the coordinates of the position of the front end section 510A, and outputs position information representing the position coordinates to the drawing processing section 14. FIG. 11 shows an example of an evaluation condition for the contact evaluation.

$$(Xp, Yp) = ((Xp1 + Xp2)/2, (Yp1 + Yp2)/2) \quad \text{Expression 2}$$

Figure 8:
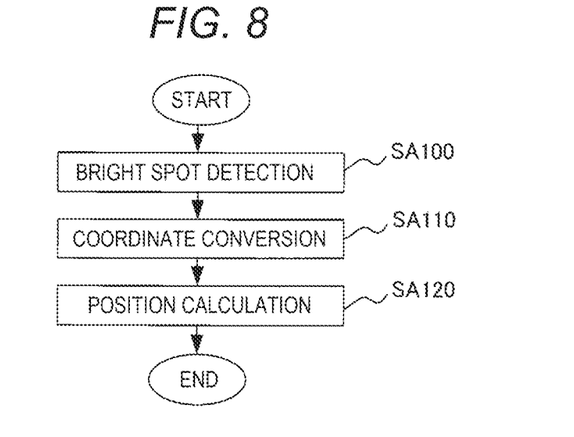
FIG. 8 is a flowchart showing the procedure of a position detect on method carried out by the projector.

FIG. 8 is a flowchart showing the procedure of a position detection method carried out by the projector 100A. The position detection method includes bright spot detection SA100, coordinate conversion SA110, and position calculation SA120, as shown in FIG. 8.

The bright spot detection SA100 is a process carried out by the bright spot detector 62. In the bright spot detection SA100, the projector 100A detects the first bright spot candidate from the first captured image from the first camera 52a and the second bright spot candidate from the second captured image from the second camera 52b.

The coordinate conversion SA110 is a process carried out by the coordinate converter 64. In the coordinate conversion SA110, the projector 100A converts the position of the first bright spot candidate in the first captured image from the first camera 52a into the first position coordinates in the projector coordinate system and converts the position of the second bright spot candidate in the second captured image from the second camera 52b into the second position coordinates in the projector coordinate system.

The position calculation SA120 is a process carried out by the position calculator 66. In the position calculation SA120, the projector 100A detects the position of the front end section 510A with respect to the projection surface SS based on the difference between the first position coordinates and the second position coordinates. Thereafter, when it has been determined based on the analysis of the captured images that the front end section 510A is in contact with the projection surface SS, and the contact notification has been detected, the projector 100A calculates the coordinates of the position of the front end section 510A in the projector coordinate system based on the first and second position coordinates. Even when it is determined based on the difference between the first position coordinates and the second position coordinates that the front end section 510A is in contact with the projection surface SS, but when the contact notification has not been detected, the coordinates of the position of the front end section 510A in the projector coordinate system is not calculated. Conversely, even when the contact notification has been received, but when it is not determined based on the difference between the first position coordinates and the second position coordinates that the front end section 510A is in contact with the projection surface SS, the coordinates of the position of the front end section 510A in the projector coordinate system is not calculated. For example, when the user presses or otherwise operates the front end section 510A of the pointing element 500A with a fingertip at a location away from the projection surface SS, so that the contact notification is transmitted, the coordinates of the position of the front end section 510A in the projector coordinate system is not calculated.

In the projection system 300 according to the present embodiment, contact of the front end section 510A with the projection surface SS is notified from the pointing element 500A, and further, using the two cameras 52 prevents misrecognition of an object different from the pointing element 500A. For example, when only one camera 52 is used, and a strongly reflective object, for example, a metal object, such as a wristwatch and a ring worn by the user, is present in addition to the pointing element 500A, the reflective object cannot undesirably be distinguished from the pointing element 500A. In contrast, using the two cameras 52 as in the present embodiment allows approximate calculation of the distance between the front end section 510A of the pointing element 500A and the projection surface SS in the axis-z direction, whereby another reflective object can be eliminated under the assumption that a reflective object that approaches the projection surface SS is the front end section 510A of the pointing element 500A.

Further, since the pointing element 500A in the present embodiment performs the communication only when the front end section 510A comes into contact with another object, the life of the battery 524 is improved as compared with the case where the pointing element 500A transmits the position information and other pieces of information periodically in synchronization with the projector 100A. Further in the present embodiment, when it has been determined by using triangulation in the analysis of a captured image that the front end section 510A is in contact with the projection surface SS, and the contact notification has been detected, final determination of the contact between the front end section 510A and the projection surface SS is made, whereby the accuracy of the detection of whether or not the contact has occurred is improved as compared with a case where whether or not the front end section 510A is in contact with the projection surface SS is evaluated only by triangulation. The accuracy of the triangulation-based calculation of the position where the front end section 510A is in contact with the projection surface SS can be improved by causing the allowance to approach zero. As described above, the present embodiment allows improvement in the life of the battery 524 built in the shaft section 520 of the pointing element 5002 is prolonged and in the accuracy of the detection of whether or not the front end section 510A of the pointing element 500A is in contact with the projection surface SS and the detection of the contact position.

2. Second Embodiment

Figure 12:
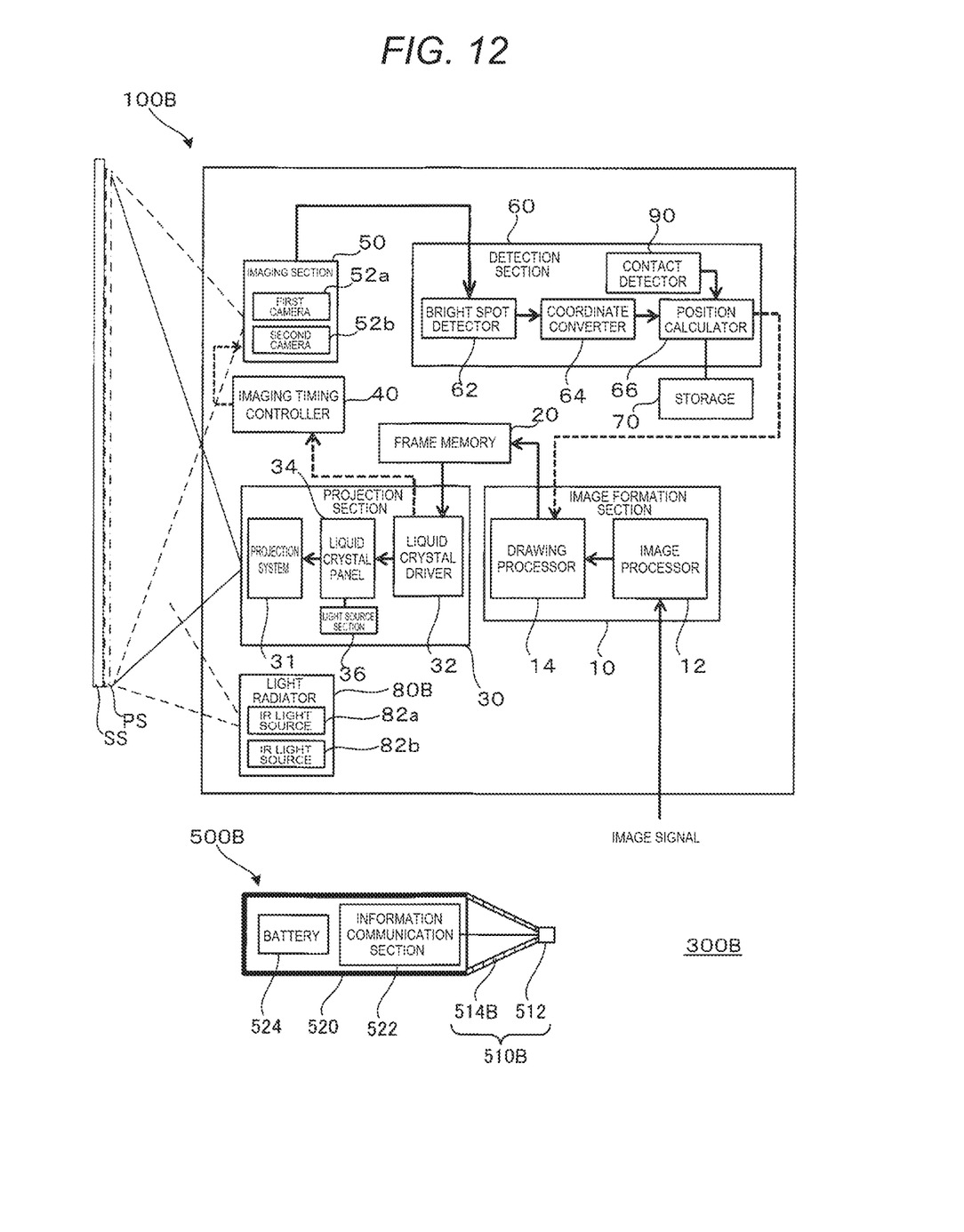
FIG. 12 is a block diagram showing an example of the configurations of a projector and a pointing element provided in a projection system according to a second embodiment of the present disclosure.

FIG. 12 is a block diagram showing an example of the configurations of a projector 100B and a pointing element 500B according to a second embodiment of the present disclosure. Using the projector 100B in FIG. 12 in place of the projector 100A in FIG. 1 and using the pointing element 500B in FIG. 12 in place of the pointing element 500A in FIG. 1 also allow formation of a projection system 300B according to the embodiment of the present disclosure. In FIG. 12, the same components as those in FIG. 3 have the same reference characters. The pointing element 500B includes a recursive reflector 514B. The projector 100B includes a light radiator 80B.

The recursive reflector 514B strongly reflects light incident thereon in the direction in which the light is incident. The light radiator 80B includes an IR light source 82a, which is a first light source provided in correspondence with the first camera 52a, and an IR light source 82b, which is a second light source provided in correspondence with the second camera 52b. The IR light sources 82a and 82b each emit infrared light, as does the IR light source 82 in the first embodiment. The light radiator 80B radiates the infrared light emitted from the IR light source 82a to the projection surface SS and radiates the infrared light emitted from the IR light source 82b to the projection surface SS.

Figure 13:
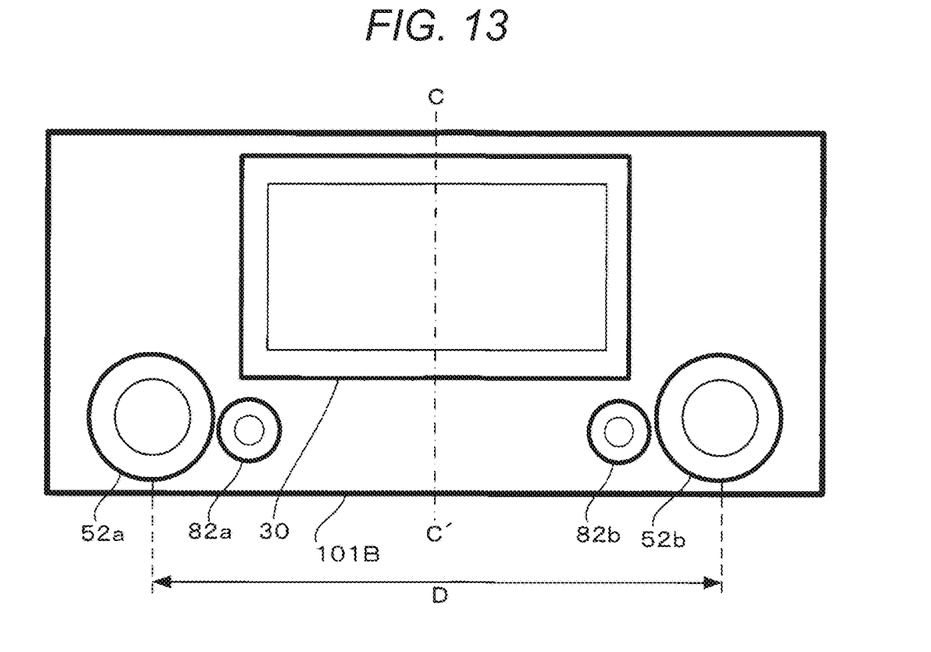
FIG. 13 shows an example of the arrangement of a first camera, a second camera, and IR light sources on a surface of the projector.

FIG. 13 shows an example of the arrangement of the projection port for the projection section 30, the radiation port for the IR light source 82a, the radiation port for the IR light source 82b, the imaging lens of the first camera 52a, and the imaging lens of the second camera 52b on a surface 101B of the projector 100B. Also in FIG. 13, the line CC' represents the center line of the surface 101B. Also in the present embodiment, the first camera 52a and the second camera 52b are provided with the gap D therebetween along the axis x symmetrically with respect to the center line CC', as shown in FIG. 13. The radiation ports for the IR light sources 82a and 82b are provided symmetrically with respect to the center line CC'. In more detail, the radiation port for the IR light source 82a is provided in the vicinity of the imaging lens of the first camera 52a, and the radiation port for the IR light source 82b is provided in the vicinity of the imaging lens of the second camera 52b.

Figure 14:
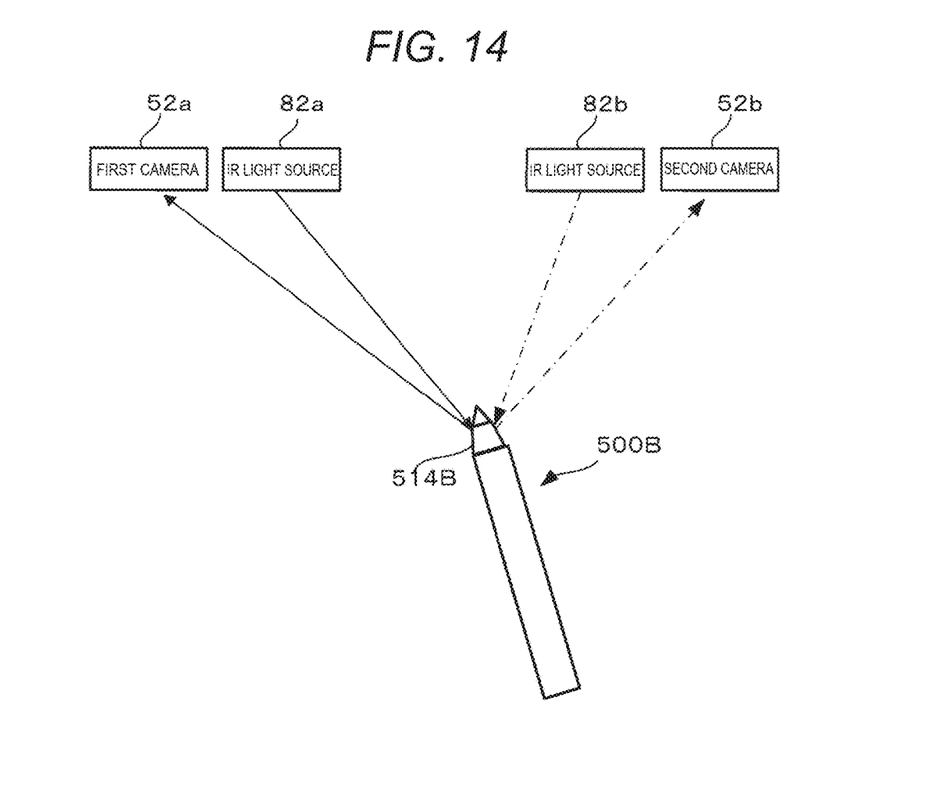
FIG. 14 shows an example of the light path of infrared light that is radiated from one of the IR light sources and travels to the first camera via recursive reflection at a recursive reflector and the light path of infrared light that is radiated from the other IR light source and travels to the second camera via recursive reflection at the recursive reflector.

FIG. 14 shows an example of the light path of the infrared light that is radiated from the IR light source 82a and travels to the first camera 52a via the recursive reflection at the recursive reflector 514B of the pointing element 500B. FIG. 14 further shows an example of the light path of the infrared light that is radiated from the IR light source 82b and travels to the second camera 52b via the recursive reflection at the recursive reflector 514B of the pointing element 500B. In FIG. 14, the light path of the infrared light that is radiated from the IR light source 82a and travels to the first camera 52a via the recursive reflection at the recursive reflector 514B is drawn by the solid-line arrows, and the light path of the infrared light that is radiated from the IR light source 82b and travels to the second camera 52b via the recursive reflection at the recursive reflector 514B is drawn by the chain-line arrows.

When the user of the projection system 300B including the projector 100B and the pointing element 500B causes a front end section 510B of the pointing element 500B to approach the projection surface SS to write something on or otherwise manipulate the projection image PS, the infrared light radiated from the IR light source 82a to the projection surface SS is strongly reflected off the recursive reflector 514B provided at the front end section 510B in the direction in which the infrared light is incident, as shown in FIG. 14. Therefore, the bright spot corresponding to the front end section 510B of the pointing element 500B is made clearly visible in the first captured image, whereby the detection accuracy can be improved. Further, the bright spot corresponding to the infrared light radiated from the IR light source 82a is displayed in the first captured image from the first camera 52a but is not displayed in the second captured image from the second camera 52b. The influence of the inclination of the pointing element 500B on the detection accuracy can therefore be suppressed. Similarly, the infrared light radiated from the IR light source 82b to the projection surface SS is strongly reflected off the recursive reflector 514B provided at the front end section 510B in the direction in which the infrared light is incident, as shown in FIG. 14. The bright spot corresponding to the infrared light radiated from the IR light source 82b is displayed in the second captured image from the second camera 52b but is not displayed in the first captured image from the first camera 52a. Also in the projector 100B in the present embodiment, the same first captured image as that in the first embodiment is provided, the same second captured image as that in the first embodiment is provided, and the accuracy of the detection of bright spots in the first and second captured images is improved.

In the projector 100B, the detection section 60 uses the first captured image from the first camera 52a and the second captured image from the second camera 52b to carry out the same position detection method as that in the first embodiment. The present embodiment therefore also provides the same effects as those provided by the first embodiment and further improves the detection accuracy.

3. Third Embodiment

In a third embodiment, the projectors 100A and 100B in the first and second embodiments each form a position detection system in which the projector includes no projection section 30 and functions as a position detection apparatus. The position detection system can be achieved as follows: The projection surface SS is replaced with a flat panel display, such as an image display panel capable of displaying an image corresponding to the projection image PS; the position display apparatus is installed as part of the flat display system; and the pointing elements 500A and 500B can point at a position on the image display surface of the flat display panel. In the position detection system, the position detection method shown in FIG. 8 is carried out as a method for controlling the position detection system. The third embodiment also provides the same effects as those provided by the first and second embodiments.

4. Other Embodiments

The embodiments described above may be combined with the following variations as appropriate.

(1) The projector 100A or 100B may each be manufactured and sold as a standalone apparatus, or the pointing element 500A or 500B may each be manufactured and sold as a standalone element.

(2) The bright spot detector 62, the coordinate converter 64, the position calculator 66, and the contact detector 90 may each be formed of an electronic circuit, such as an ASIC, and the electronic circuits may be combined with one another to form the detection section 60.

(3) A program that causes a typical computer to function as the detection section 60 may be manufactured and distributed as a standalone program. The reason for this is that causing a computer of a related-art projector that includes a light radiator that radiates infrared light to a projection surface and two cameras and detects the position of a front end section of a pointing element based on triangulation to be operated in accordance with the program allows the projector to function as the projector 100A in the first embodiment described above. Conceivable examples of a specific method for distributing the program described above may include an aspect in which a computer readable recording medium, such as a flash ROM (read only memory), on which the program described above is written is distributed and an aspect in which the program described above is distributed as a program downloaded via an electric communication line, such as the Internet.

What is claimed is:

1. A projection system comprising:
a projector that projects a projection image on a projection surface; and
a pointing element that points at the projection surface,
wherein the pointing element includes
a recursive reflector that is provided at a front end section of the pointing element and that reflects infrared light, and
an information communication transmitter that transmits contact notification to the projector when the pointing element senses contact between the front end section and an object; and
wherein the projector includes
a light radiator that radiates the infrared light toward the projection surface,
a first camera that captures an image of the projection surface,
a second camera that is disposed in a position different from a position of the first camera and captures an image of the projection surface, and
one or more electronic circuits,
wherein the one or more electronic circuits is configured to detect a position where the pointing element comes into contact with the projection surface based on a position of the recursive reflector detected with the first and second cameras and the contact notification.

2. The projection system according to claim 1,
wherein the one or more electronic circuits is configured to detect the contact notification, and
wherein the one or more electronic circuits is configured to detect a first bright spot candidate that is a candidate of a bright spot corresponding to the infrared light reflected off the recursive reflector from a first captured image captured with the first camera and a second bright spot candidate that is a candidate of the bright spot from a second captured image captured with the second camera.

3. The projection system according to claim 2,
wherein the second camera is so disposed as to be separate from the first camera along one of a first coordinate axis perpendicular to a normal to the projection surface and a second coordinate axis perpendicular to the normal and the first coordinate axis, and
wherein the one or more circuits is configured to convert coordinates of a position of the first bright spot candidate in the first captured image into first position coordinates in a two-dimensional coordinate system specified by the first and second coordinate axes and converts coordinates of a position of the second bright spot candidate in the second captured image into second position coordinates in the two-dimensional coordinate system, and
wherein the one or more circuits is configured to calculate coordinates of a position of the front end section in the two-dimensional coordinate system based on the first and second positional coordinates when the contact detector evaluates whether or not the front end section is in contact with the projection surface based on a difference between the first position coordinates and the second position coordinates, determines that the front end section is in contact with the projection surface, and detects the contact notification.

4. The projection system according to claim 1,
wherein the light radiator includes a first light source so provided as to correspond to the first camera and a second light source so provided as to correspond to the second camera.

5. The projection system according to claim 2,
wherein the one or more circuits is configured to detect as the first bright spot candidate an area in the first captured image that is an area which corresponds to a set of pixels each having a pixel value greater than or equal to a first threshold and in which the number of pixels that belongs to the area is smaller than a second threshold and further detects as the second bright spot candidate an area in the second captured image that is an area which corresponds to a set of pixels each having a pixel value greater than or equal to the first threshold and in which the number of pixels that belongs to the area is smaller than the second threshold.

6. The projection system according to claim 2,
wherein the one or more circuits is configured to evaluate whether or not the front end section is in contact with the projection surface when the first bright spot candidate was detected and the second bright spot candidate was detected.

7. The projection system according to claim 6,
wherein the one or more circuits is configured to determine that the front end section is in contact with the projection surface when a difference between the first position coordinates and second position coordinates along the one of the first and second coordinate axes is smaller than or equal to a third threshold and a difference between the first position coordinates and second position coordinates along another of the first and second coordinate axes is smaller than or equal to the third threshold.

8. A position detection system comprising:
a pointing element that points at an operation surface; and
a position detection apparatus that detects a position at which the pointing element is pointing,
wherein the pointing element includes
a recursive reflector that is provided at a front end section of the pointing element and that reflects infrared light, and
an information communication transmitter that transmits contact notification to the position detection apparatus when the pointing element senses contact between the front end section and the operation surface, and
the position detection apparatus includes
a light radiator that radiates the infrared light toward the operation surface,
a first camera that captures an image of the operation surface,
a second camera that is disposed in a position different from a position of the first camera and captures an image of the operation surface, and
one or more electronic circuits configured to detect a position where the pointing element is pointing at the operation surface based on a position of the recursive reflector detected with the first and second cameras and the contact notification.

9. A method for controlling a position detection system,
wherein the position detection system includes a pointing element that points at an operation surface and includes a recursive reflector that is disposed at a front end section of the pointing element and that reflects infrared light, and a position detection apparatus that includes a first camera and a second camera disposed in a position different from a position of the first camera and detects a position at which the pointing element is pointing, wherein the method comprises:

transmitting, via the pointing element, contact notification to the position detection apparatus when the pointing element senses contact between the front end section and the operation surface, causing, via the position detection apparatus, a light radiator to radiate the infrared light toward the operation surface, causing, via the position detection apparatus, the first and second cameras to each capture an image of the operation surface, and detecting, via the position detection apparatus, a position where the pointing element is pointing at the operation surface based on a position of the recursive reflector detected with the first and second cameras and the contact notification.

10. The method for controlling a position detection system according to claim 9, further comprising:

detecting, via the position detection apparatus, a first bright spot candidate that is a candidate of a bright spot corresponding to the infrared light reflected off the recursive reflector from a first captured image provided when the first camera captures an image of the operation surface and a second bright spot candidate that is a candidate of the bright spot from a second captured image provided when the second camera captures an image of the operation surface.

11. The method for controlling a position detection system according to claim 10, wherein the second camera is so disposed as to be separate from the first camera along one of a first coordinate axis perpendicular to a normal to the operation surface and a second coordinate axis perpendicular to the normal and the first coordinate axis, and wherein the method further comprises:

converting, via the position detection apparatus, coordinates of a position of the first bright spot candidate in the first captured image into first position coordinates in a two-dimensional coordinate system specified by the first and second coordinate axes and converts coordinates of a position of the second bright spot candidate in the second captured image into second position coordinates in the two-dimensional coordinate system, and calculating, via the position detection apparatus, coordinates of a position of the front end section in the two-dimensional coordinate system based on the first and second positional coordinates when the position detection apparatus evaluates whether or not the front end section is in contact with the operation surface based on a difference between the first position coordinates and the second position coordinates, determines that the front end section is in contact with the operation surface, and detecting, via the position detection apparatus, the contact notification.

* * * * *